United States Patent Office 2,890,128
Patented June 9, 1959

---

2,890,128

CARBONACEOUS CEMENT

Raymond M. Bushong, Charles W. Clark, and Frank P. Holloway, Fostoria, Ohio, assignors to Union Carbide Corporation, a corporation of New York No Drawing. Application March 24, 1954
Serial No. 418,481

7 Claims. (Cl. 106—80)

---

This invention relates to carbonaceous cement.

Carbonaceous cements used in joints between structural forms of carbon generally consist of finely-divided carbon material and a carbonizable binder. A conventional binder for certain classes of cement such as that used for filling in spaces in electrode joints is an aqueous solution of glucose or other sugar. Another binder commonly used in carbonaceous cements is pitch. For applications where the strength of the joint is dependent on the cement and where high temperatures are likely to be encountered, for instance in a blast furnace, neither of these types of cement is entirely satisfactory. The former tends to swell and become porous when it is heated rapidly, and the binder in the latter, being thermoplastic, tends to run out of the joint when it is rapidly heated. For applications where these difficulties are encountered, cements containing a thermosetting binder have been introduced, but they, too, are not satisfactory in all respects. Notably they tend to produce noxious, sometimes toxic, odors, have poor coking values, and suffer excessive shrinkage.

Because of the increasing usage of structural carbon shapes, such as brick for lining blast furnaces and other high temperature apparatus, there is an increasing demand for a carbonaceous cement which is free of the disadvantages of the cements heretofore used.

It is the principal object of this invention to satisfy this demand. More specifically, it is an object of the invention to provide a carbonaceous cement capable of producing a strong, heat-resistant joint between carbon shapes.

The invention by means of which these objects are achieved comprises a carbonaceous cement composed of finely-divided carbon, pitch having a melting point above about 130° C., and, as a temporary binder, a water-soluble material incapable of dissolving said pitch and having the property of stiffening at a temperature substantially below the melting point of said pitch. Sufficient water is present in the cement of the invention to give it a desired degree of fluidity so that it may be applied by trowelling. The cement contains by weight 25% to 40% pitch; 10% to 40% temporary binder; the remainder finely-divided carbon plus the addition of sufficient water to render said cement of trowellable consistency.

The carbon constituent of the cement of the invention is a conventional carbon flour and may be composed of finely-divided, petroleum coke for example. For most purposes all the carbon particles should be small enough to pass a 35 mesh screen (0.4 mm. openings) and the majority of the carbon particles should be fine enough to pass a 200 mesh screen (0.07 mm. openings). The carbonizable binder is a pitch, preferably a coal tar pitch, having a melting point of at least 130° C. Generally, the higher the melting point of the pitch, the stronger will be the cement. A pitch having a melting point of about 175° C. is preferred for a cement to be used in a blast furnace. The pitch should be of a particle size sufficiently small to pass a 35 mesh screen (0.4 mm. openings).

The temporary binder in the cement of the invention serves at least two functions. It provides a temporary set to the cement to hold it in place and furthermore forms a matrix to prevent the thermoplastic binder from running out when the cement is heated. Any of a number of materials, inorganic and organic, may be used as the temporary binder, but whatever material is used must have the property of stiffening at a temperature well below the melting point of the pitch used in the cement. Stiffening may be caused by the "setting-up" of an inorganic material, or by the carbonization of an organic material. By this stiffening action, the cement is held in place. Also the stiffened cement forms a matrix or network which, when the cement is further heated, permits the permanent binder to soften and flow throughout the matrix but prevents its exudation from the joint. Upon continued heating, this permanent binder is carbonized within the matrix, forming a strong joint.

The temporary binder, in addition to having the property of stiffening at a temperature well below the melting point of the permanent binder material must have enough strength to prevent joint distortion. It must not dissolve the permanent binder, and must not shrink to an undesirable degree. Water-soluble materials best fulfill all of these requirements and have further advantages in their cheapness and freedom from toxic or obnoxious odors.

Inorganic materials which may be used in the cement of the invention for the temporary binder include sodium silicate, potassium silicate, and conventional clays. Organic materials which may be used include ordinary molasses, wood lignin and wheat paste. Equivalent inorganic and organic materials will suggest themselves to those skilled in the art. Of the inorganic materials, sodium silicate is preferred; of the organic materials, molasses is preferred.

Although, as indicated, either an inorganic material or an organic material may be used as the temporary binder, there are some disadvantages associated with both. If an inorganic material is used alone, the cement contains inorganic constituents which for some purposes is undesired. Moreover, shrinkage tends to be more severe with some inorganic materials than with organic materials. On the other hand, the organic materials, if heated too rapidly have a tendency to swell excessively and lead to excessive porosity. For most purposes, therefore, it is desirable to use both an inorganic material and an organic material. The tendency toward excessive swelling of the latter is counteracted by the tendency to excessive shrinkage of the former. And by using some organic material, the quantity of inorganic material introduced into the cement is of course reduced.

In view of the above consideration the cement of the invention contains by weight 25% to 40% pitch having a melting point of at least 130° C., 10% to 35% temporary binder, the remainder finely-divided carbon with sufficient water to give the desired consistency. More specifically, a cement according to the invention may contain, on a dry basis, 25% to 40% coal tar pitch of 175° C. melting point; 3% to 35% sodium silicate; or 5% to 30% molasses; or 10% to 40% in the aggregate of sodium silicate and molasses; the remainder finely-divided coke. A particular composition that has proved to be excellent contains 31% petroleum coke (60% through 200 mesh screen); 28% coal tar pitch of 175° C. melting point (all through 35 mesh screen); 3% sodium silicate; 23% molasses; and 15% water. A preservative such as formaldehyde may be incorporated with such a composition to prevent fermentation of the molasses.

The cement of the invention may be prepared by blending the carbon flour and the pitch in conventional manner and by adding to the blend an aqueous solution of the temporary binder. Mixing may be accomplished in a conventional mixer or may be done conveniently in a mortar box with a hoe.

The cement is used like any conventional mortar, being easily applied by trowelling. To produce a permanent bond, it is heated to at least about 500° C., the rate of heating being relatively unimportant. In the case of a lining for high temperature equipment, such as a blast furnace, the lining is laid up in conventional manner using the cement as indicated, and the equipment placed in operation, the heat of operation being more than sufficient to cause the cement to be permanently bonded in situ.

Test joints between carbon bricks have demonstrated the excellent properties of the cement of the invention. In one series of such tests a number of different cement formulations were prepared and used. The joined articles were heated to different temperatures and cooled to room temperature. From the joined bricks, test specimens were cut so that the joint was in the center of the specimens and the specimens were tested for flexural strength by the application of a load at the joint while the specimens were supported on knife edges near the ends thereof. Typical test results are reported in the following table. In each of the joints tested, the cement layer was 1/32 inch thick.

| Dry Constituents | | | Flexural Strength-Pounds-Test at Room Temperature after Baking at: | |
|---|---|---|---|---|
| Coke | Pitch | Sodium Silicate, percent | 700° C. | 1,600° C. |
| 57% | 15% | 33 | 100 | (*) |
| 42% | 25% | 33 | 540 | 420 |
| 37% | 30% | 33 | 710 | |
| 32% | 35% | 33 | 600 | 420 |
| 27% | 40% | 33 | 800 | 540 |
| 10 parts | 9 parts | 5 | 180 | 120 |
| 10 parts | 9 parts | 15 | 730 | 240 |
| 10 parts | 9 parts | 24 | 720 | 180 |
| 10 parts | 9 parts | 32 | 900 | 180 |

*Joint failed during preparation of specimen.

Similar tests to those reported in the table have shown that the optimum proportion of molasses is about 20% to 30%.

It is thus evident that the cement of the invention makes possible the production of strong, heat-resistant joints between carbon shapes. Further, the use of the cement is not accompanied by the disadvantages of prior cements.

We claim:

1. A carbonizable cement composed of 25% to 40% pitch having a melting point of at least 130° C.; 10% to 40% of a temporary binder composed of at least one material selected from the group consisting of sodium silicate, potassium silicate and clay, and at least one material selected from the group consisting of molasses, wood lignin and wheat paste, said binder having the property of stiffening at a temperature substantially below the melting point of said pitch and thereby serving to hold said cement in place and to form a matrix for retention of said pitch during carbonization thereof, said pitch being insoluble in said temporary binder; the material selected from said first-mentioned group being present in said cement in a proportion between 3% and 35% of said cement by weight, and the material selected from said second-mentioned group being present in said cement in a proportion of 5% to 30% of said cement by weight; the remainder of said cement being finely-divided carbon plus sufficient water to render the same of trowellable consistency.

2. A cement as defined by claim 1 in which said temporary binder contains sodium silicate and molasses, the silicate content being 3% to 35% of said cement by weight and the molasses content being 5% to 30% of said cement by weight.

3. A carbonizable cement composed of 10% to 40% in the aggregate of sodium silicate and molasses; 25% to 40% of finely-divided pitch having a melting point of at least 130° C.; the remainder finely-divided carbon, plus sufficient water to render said cement of trowellable consistency, the sodium silicate content being 3% to 35% of said cement by weight and the molasses content being 5% to 30% of said cement by weight.

4. A cement as defined in claim 3 in which said pitch is coal tar pitch having a melting point of at least 175° C.

5. A cement as defined in claim 4 in which said finely-divided carbon is petroleum coke the majority of which is fine enough to pass a 200 mesh (0.07 mm. openings) screen.

6. A carbonaceous cement composed substantially, by weight of 31% finely-divided petroleum coke; 28% coal tar pitch having a melting point of about 175° C.; 3% sodium silicate; 23% molasses; the remainder water.

7. A cement as defined by claim 1, in which said temporary binder is a material selected from the group consisting of sodium silicate, potassium silicate and clay, and is present in a proportion of 3% to 35% of said cement by weight.

References Cited in the file of this patent

UNITED STATES PATENTS

| Re. 23,355 | Wallace | Apr. 10, 1951 |
| 21,158 | Thompson | Aug. 10, 1858 |
| 61,648 | Kosinski | Jan. 29, 1867 |
| 457,763 | Eltringham | Aug. 11, 1891 |
| 808,339 | Butterfield | Dec. 26, 1905 |
| 1,988,543 | Daimler | Jan. 22, 1935 |

FOREIGN PATENTS

| 294,661 | Germany | 1916 |